(12) United States Patent
Schulte (10) Patent No.: US 11,470,980 B2
(45) Date of Patent: Oct. 18, 2022

(54) MULTI-FUNCTION DEVICE FOR AN ADJUSTABLE BED SYSTEM

(71) Applicant: Fredman Bros. Furniture Company, Inc., St. Louis, MO (US)

(72) Inventor: John Schulte, Lake St. Louis, MO (US)

(*) Notice: Subject to any disclaimer, the term of this patent is extended or adjusted under 35 U.S.C. 154(b) by 236 days.

(21) Appl. No.: 16/108,305

(22) Filed: Aug. 22, 2018

(65) Prior Publication Data

US 2020/0060429 A1 Feb. 27, 2020

(51) Int. Cl.
| | |
|---|---|
| *A47C 21/00* | (2006.01) |
| *A47C 31/00* | (2006.01) |
| *A47C 20/04* | (2006.01) |
| *H01R 13/73* | (2006.01) |
| *H01R 25/00* | (2006.01) |
| *A47C 17/04* | (2006.01) |
| *H01R 13/717* | (2006.01) |
| *H01R 13/70* | (2006.01) |
| *H04W 12/06* | (2021.01) |

(52) U.S. Cl.
CPC ............ *A47C 21/003* (2013.01); *A47C 17/04* (2013.01); *A47C 20/041* (2013.01); *A47C 31/008* (2013.01); *H01R 13/73* (2013.01); *H01R 25/006* (2013.01); *H01R 13/701* (2013.01); *H01R 13/717* (2013.01); *H04W 12/06* (2013.01)

(58) Field of Classification Search
CPC ..... A47C 21/003; A47C 17/04; A47C 20/041; A47C 31/008; H01R 25/006; H01R 13/73; H01R 13/701; H01R 13/717; H01R 24/62; H01R 25/003; H04W 12/06
See application file for complete search history.

(56) References Cited

U.S. PATENT DOCUMENTS

| | | | | | |
|---|---|---|---|---|---|
| 2,331,313 | A | * | 10/1943 | Eby ................... | H01B 17/58 403/197 |
| 3,585,356 | A | * | 6/1971 | Hall ................... | A47C 27/085 5/422 |
| 3,681,552 | A | * | 8/1972 | Bailey ................ | H01H 13/02 200/295 |
| 3,742,527 | A | * | 7/1973 | Johnston ............ | A61G 7/0507 5/611 |
| 3,790,753 | A | * | 2/1974 | Miller ................ | A47C 27/085 219/528 |
| 3,805,004 | A | * | 4/1974 | Kondo ............... | H01H 13/023 200/311 |
| 4,183,015 | A | * | 1/1980 | Drew ................. | A61G 7/0507 340/286.07 |
| 4,612,679 | A | * | 9/1986 | Mitchell ............. | A61G 7/05 5/425 |
| 6,106,576 | A | * | 8/2000 | Fromson ............ | A61H 1/00 318/16 |
| 6,155,260 | A | * | 12/2000 | Lavin ................. | A61G 1/04 128/845 |
| 7,246,389 | B2 | | 7/2007 | Taguchi et al. | |
| 8,019,486 | B2 | | 9/2011 | Rawls-Meehan | |

(Continued)

*Primary Examiner* — Myles A Throop
(74) *Attorney, Agent, or Firm* — David H. Chervitz (57) ABSTRACT

A multi-function device for an adjustable bed system is disclosed which has a housing having a top section and a side section, the side section having a button having a light and a port, operation of the button for sending a signal, a cord connected to the housing, the cord having a wire connected to the button, and a connector connected to the wire.

20 Claims, 6 Drawing Sheets

(56) References Cited

U.S. PATENT DOCUMENTS

| | | | |
|---|---|---|---|
| 8,893,339 B2 | 11/2014 | Fleury et al. | |
| 8,909,378 B2 | 12/2014 | Rawls-Meehan | |
| 9,295,338 B2 | 3/2016 | Rawls-Meehan | |
| 10,357,107 B2* | 7/2019 | Jacobs | A47C 7/725 |
| 11,350,758 B2* | 6/2022 | Nava | A47C 17/04 |
| 2005/0184867 A1* | 8/2005 | Osann | H04L 67/125 |
| | | | 340/539.25 |
| 2010/0017958 A1* | 1/2010 | Mishael | A47C 19/205 |
| | | | 5/9.1 |
| 2011/0115635 A1* | 5/2011 | Petrovski | A47C 31/008 |
| | | | 340/584 |
| 2013/0289770 A1* | 10/2013 | Rawls-Meehan | A61H 23/02 |
| | | | 700/275 |
| 2015/0025688 A1* | 1/2015 | Hille | A47C 31/008 |
| | | | 700/275 |
| 2016/0081127 A1* | 3/2016 | Lee | H04W 12/06 |
| | | | 709/228 |
| 2016/0120740 A1* | 5/2016 | Rawls-Meehan | A47C 31/008 |
| | | | 601/49 |
| 2016/0135607 A1* | 5/2016 | Ocegueda | A47C 21/044 |
| | | | 5/423 |
| 2016/0306949 A1* | 10/2016 | Tallapaneni | H04W 12/0431 |
| 2016/0321447 A1* | 11/2016 | Lancioni | H04W 12/06 |
| 2017/0339731 A1* | 11/2017 | Vankieken | H04W 4/80 |
| 2018/0027984 A1* | 2/2018 | Ocegueda Gallaga | |
| | | | A47C 27/082 |
| 2018/0176079 A1* | 6/2018 | Teo | H04W 52/0219 |
| 2020/0128968 A1* | 4/2020 | Fu | A47C 27/001 |

\* cited by examiner

MULTI-FUNCTION DEVICE FOR AN ADJUSTABLE BED SYSTEM

BACKGROUND

This disclosure relates to adjustable beds and adjustable bed frames and more particularly to an adjustable bed system having a multi-function device incorporated with the adjustable bed system.

Conventional beds may consist of a mattress, a box spring, a headboard, a foot board, a pair of spaced apart bed rails, and longitudinally spaced, transversely extending wooden or metal slats extending between the bed rails. The slats and the bed rails are used to support the mattress and box spring above the floor upon which the bed is positioned. In order to provide for more comfort for an individual user of a bed, adjustable beds have been developed. Some adjustable beds are used for medical reasons such as aiding recovery for an individual. An adjustable bed may consist of one or more sections that may be moved or adjusted during use by employing actuators or motors to move the sections. Some known adjustable beds are operated by use of a wired control or a wireless remote control that are part of the adjustable bed and are connected to a control box. Although such adjustable beds are available and useful, it is difficult or impossible to interact with the control box to control some features associated with the adjustable bed. For example, it may be necessary to synchronize various devices with the control box. However, it may be difficult or impractical to reach the control box. In view of this, a better and user friendly system to operate adjustable beds through the use of a multi-function device may be desired.

The present disclosure is designed to obviate and overcome many of the disadvantages and shortcomings associated with conventional adjustable beds. In particular, the present disclosure provides a multi-function device or unit that is incorporated into an adjustable bed system that is used to control certain operations of a control box associated with the adjustable bed system. It would also be advantageous to have a multi-function device or unit that is not complex and is easy to use in order to operate the adjustable bed system. The present multi-function device is applicable for use with full, queen, California kings, and king size adjustable bed systems.

SUMMARY

In one form of the present disclosure, a multi-function device for an adjustable bed system comprises a housing having a top section and a side section, the side section having a button having a light and a port, operation of the button for sending a signal, a cord connected to the housing, the cord having a wire connected to the button, and a connector connected to the wire.

In another form of the present disclosure, a multi-function device for an adjustable bed system comprises a housing having a top section and a side section, the side section having a button having a light and a port, operation of the button for sending a signal, a central body housing having a first side, a back side, an extension portion along the back side, a second side, and a lid to cover the central body housing, a cord connected to the housing, the cord having a wire connected to the button, and a connector connected to the wire.

In yet another form of the present disclosure, a multi-function device for an adjustable bed system comprises a housing having a top section and a side section, the side section having a button having a light and a port, operation of the button for sending a signal, a cord connected to the housing, the cord having a wire connected to the button, and a connector connected to the wire, and an adjustable bed system having a control box having a plug, the connector for insertion into the plug, the signal for placing the control box into a mode of operation.

In light of the foregoing comments, it will be recognized that the present disclosure provides a multi-function device for an adjustable bed system that may be used to operate various functions associated with an adjustable bed.

The present disclosure provides a multi-function device for an adjustable bed system which can be easily employed and operated with highly reliable results.

The present disclosure is also directed to a multi-function device for an adjustable bed system that responds to various input commands to operate various functions associated with an adjustable bed.

The present disclosure also provides a multi-function device for an adjustable bed system which includes one or more USB (universal serial bus) ports.

The present disclosure provides a multi-function device for an adjustable bed system that is capable of being incorporated into the adjustable bed system and can be easily operated without the use of any specialized equipment.

The present disclosure also provides a multi-function device for an adjustable bed system that controls various operations associated with an adjustable bed.

The present disclosure provides a multi-function device for an adjustable bed system that is employed to assist an individual to adjust and operate the adjustable bed system.

The present disclosure is directed to a multi-function device for an adjustable bed system in which the multi-function device is positioned so that the multi-function device may be accessed even when the adjustable bed system is operating.

The present disclosure is further directed to a multi-function device for an adjustable bed system in which the multi-function device is capable of being accessed regardless of the position of the adjustable bed system.

The present disclosure also provides a multi-function device for an adjustable bed system that provides feedback concerning various operations of the adjustable bed system.

The present disclosure further provides a multi-function device for an adjustable bed system that may be used with any sized mattress such as a full, twin, queen, California king, and king sized mattress.

The present disclosure is also directed to a multi-function device for an adjustable bed system that comprises a module or unit that may be constructed as part of the adjustable bed system.

These and other applications and advantages of the present disclosure will become apparent after considering the following detailed specification in conjunction with the accompanying drawings, wherein

DETAILED DESCRIPTION OF AN EMBODIMENT

Figure 1:
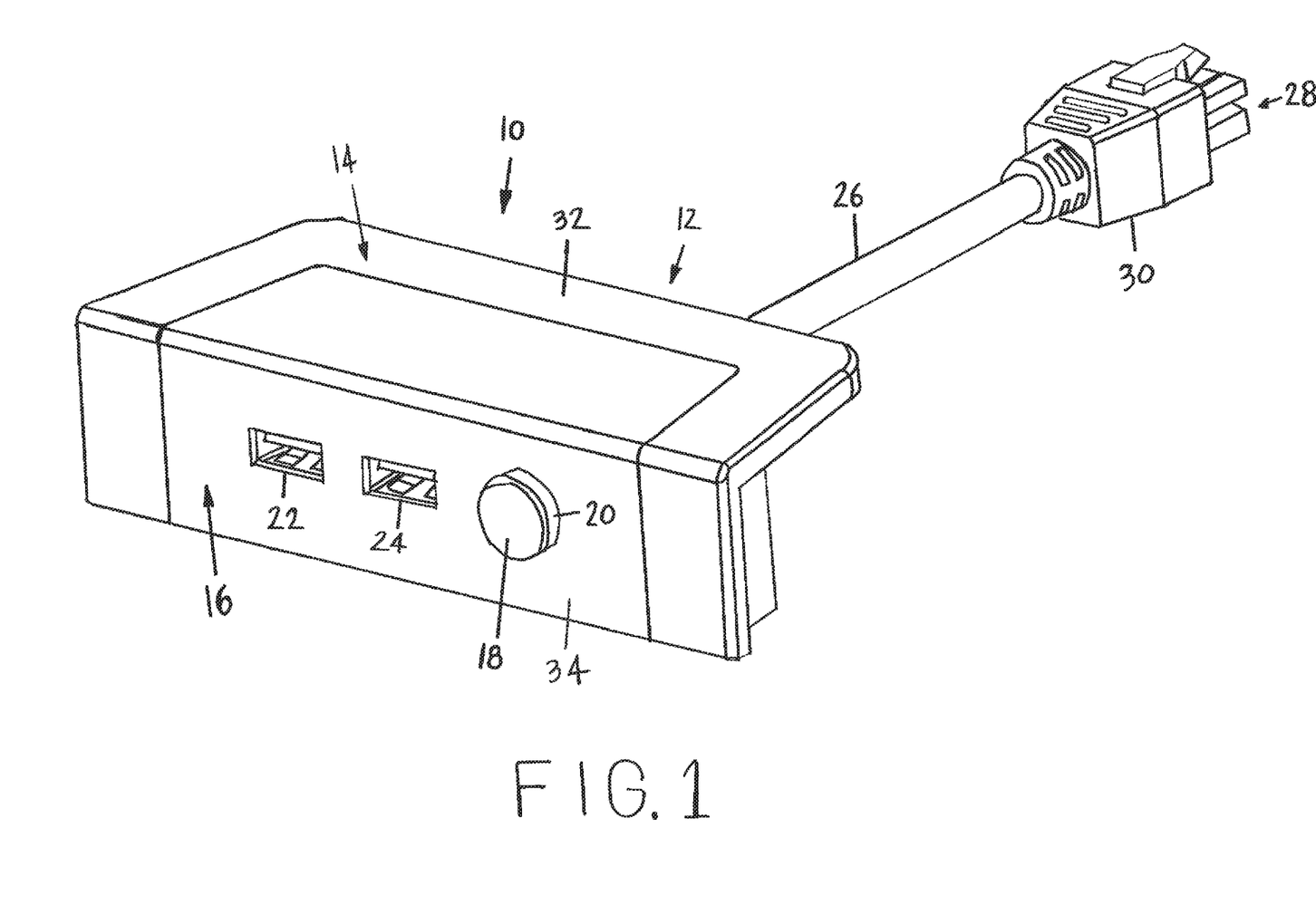
FIG. 1 is a front perspective view of a multi-function device for an adjustable bed system constructed according to the present disclosure.

Referring now to the drawings, wherein like numbers refer to like items, number 10 identifies an embodiment of a multi-function device for an adjustable bed system constructed according to the present disclosure. With reference now to FIG. 1, the multi-function device for an adjustable bed system 10 is shown comprising a device housing 12 having an upper portion 14 and a side portion 16. The side portion 16 has a button 18 that has a light 20 and a first USB (Universal Serial Bus) port 22 and a second USB port 24. Although USB ports 22 and 24 are shown, it is possible that the ports may be USB-B, Mini-USB, Micro-USB type, as required by the particular application. Further, it is contemplated that more than a pair of ports 22 and 24 may be used or a single port may be incorporated into the device 10. A cord 26 extends out from the device housing 12 and has an end 28 having a plug or connector 30. The cord 26 can be any suitable length and will typically be long enough to have the connector 30 connected to a control box (not shown) associated with an adjustable bed system (also not shown). The housing 12 and the portions 14 and 16 may be constructed of any suitable material with plastic being a preferred material. The light 20 may be illuminated to indicate one or more modes associated with the multi-function device 10, as will be discussed further herein. The housing 12 also has an outer cover plate 32 and an inner cover plate 34.

Figure 2:
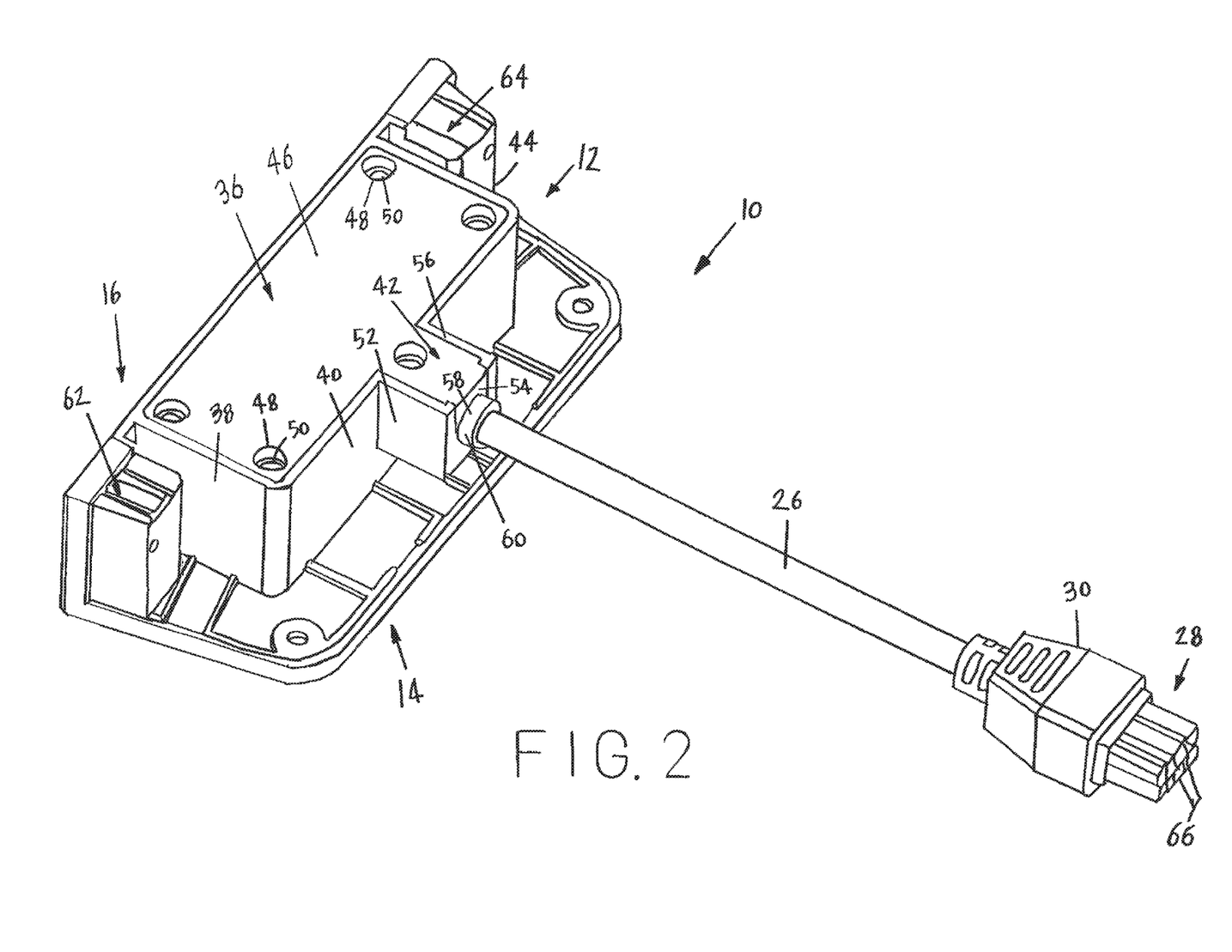
FIG. 2 is a bottom perspective view of the multi-function device for an adjustable bed system constructed according to the present disclosure.

FIG. 2 is a bottom perspective view of the multi-function device for an adjustable bed system 10 constructed according to the present disclosure. The device 10 has the device housing 12 having the upper portion 14 and the side portion 16. The device housing 12 also has a central body housing 36 having a first side 38, a back side 40, an extension portion 42 along the back side 40, and a second side 44. A lid 46 is used to cover the central body housing 36. The lid 46 may have a number of screw holes 48 for receiving screws 50 to secure the lid 46 to the central body housing 36. The extension portion 42 has a first side 52, a back side 54, and a second side 56. The back side 54 may have an opening 58 in which a grommet or a strain relief connector 60 may be inserted to hold or secure the cord 26 in place. The device housing 12 also has a first clip 62 and a second clip 64. The clips 62 and 64 are used to secure the device housing 12 to an adjustable bed system (not shown), as will be explained further herein. The plug 30 has the end 28 having a number of sockets 66 which are adapted to fit into a port (not shown) associated with a control box (also not shown). The sockets 66 are connected to wires (not shown) within the cord 26. The sockets 66 allow data, signals, pulses, or frequencies to be provided from the button 18 or the USB ports 22 and 24 to the control box. The sockets 66 also allow power to be provided from the control box to the USB ports 22 and 24 or the light 20.

Figure 3:
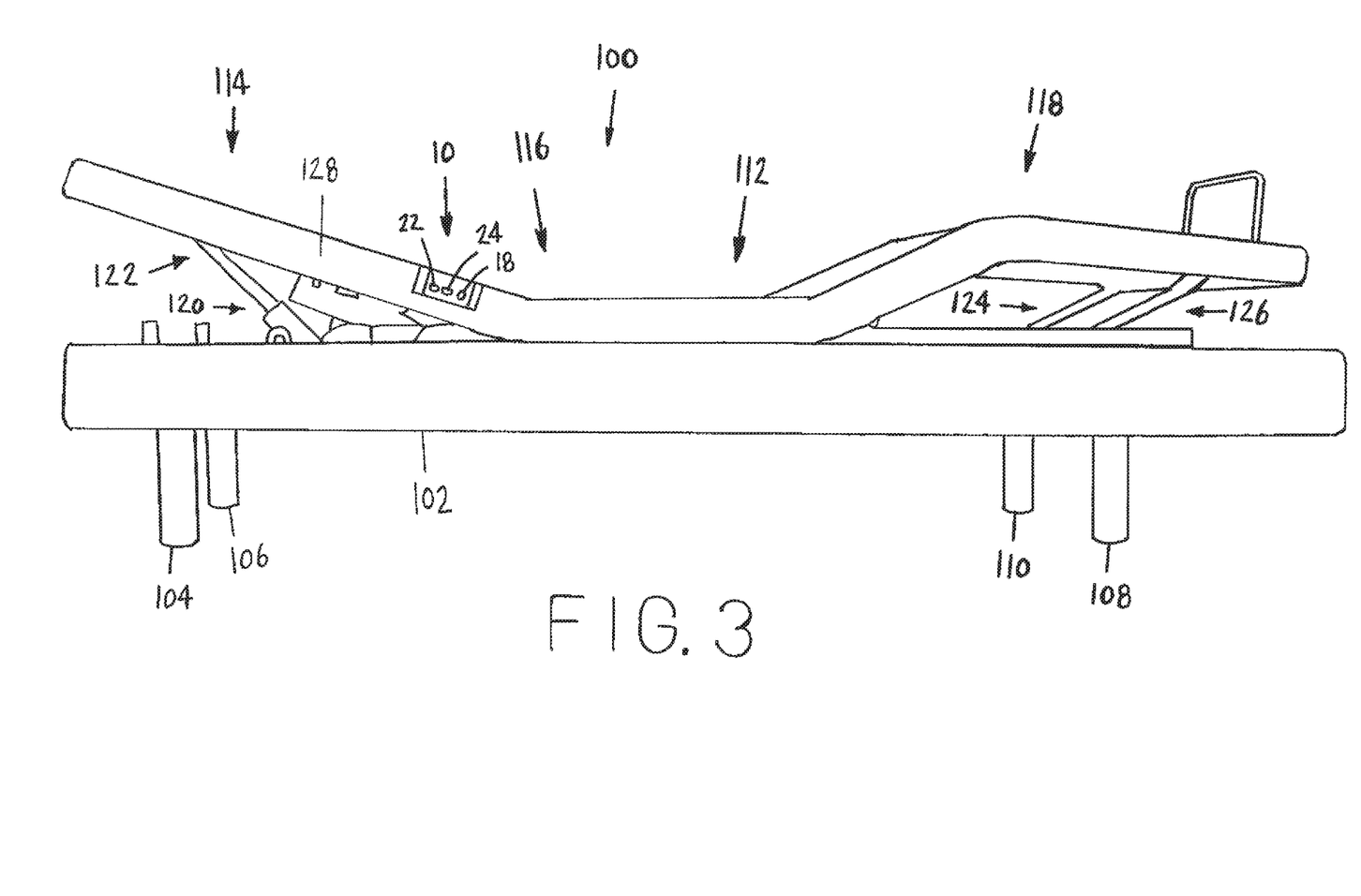
FIG. 3 is a side perspective view of the multi-function device for an adjustable bed system installed in the adjustable bed system with the adjustable bed system being in an adjusted position.

With reference now to FIG. 3, an adjustable bed system 100 having the multi-function device 10 incorporated therein is depicted. The adjustable bed system 100 has a base 102 being supported by legs 104, 106, 108, and 110. The base 102 has an adjustable bed frame 112 having a head section 114, a mid section 116, and a foot section 118. The head section 114 may be adjusted or articulated by use of motor 120 and arms 122. The arms 122 are connected between the head section 114 and the motor 120. Operation of the motor 120 will cause movement of the arms 122 which in turn may raise or lower the head section 114 as desired. The foot section 118 may also have a motor 124 and arms 126. An individual operating the system 100 may control movement of the foot section 118 through operation of the motor 124 to move the arms 126 to raise or lower the foot section 118.

The multi-function device 10 is shown installed on a side 128 of the head section 114. The device 10 has the button 18 and the ports 22 and 24 present for an individual to be able to press the button 18 or to insert various cords into the ports 22 and 24. For example, a smart phone may be connected to the port 22 to charge the smart phone through use of the USB port 22. As can be appreciated, other devices, such as a laptop or a tablet, may also be connected to the port 22 for charging purposes. Although not shown in this particular view, the adjustable bed system 100 may have various other components positioned within the base 102. For example, a control box (not shown) may be housed within the base 102 and the plug 30 may be connected into the control box. In this manner, the cord 26 and the plug 30 are not easily accessible to a user of the adjustable bed system 100 and the cord 26 and the plug 30 are not in the way.

Figure 4:
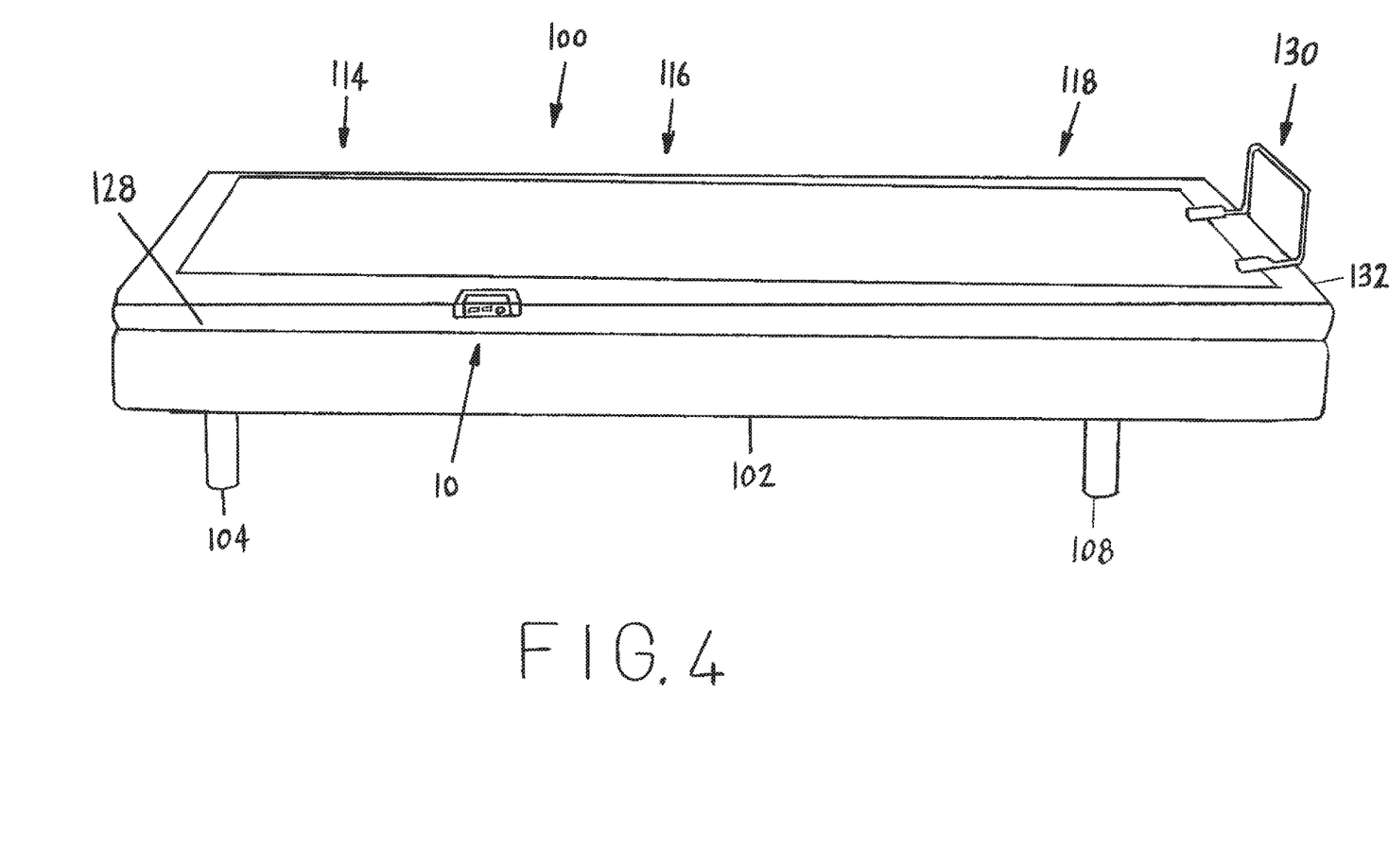
FIG. 4 is a side perspective view of the multi-function device for an adjustable bed system installed in the adjustable bed system with the adjustable bed system being in a relaxed or original position.

FIG. 4 illustrates the adjustable bed system 100 in an original position in which the head section 114 and the foot section 118 have not been raised. The adjustable bed system 100 is shown having the base 102 being supported by legs 104 and 108. The base 102 has the adjustable bed frame 112 having the head section 114, the mid section 116, and the foot section 118. The motors 120 and 124 and the arms 122 and 126 are not visible because the adjustable bed frame 112 is in the original position. The adjustable bed system 100 also has a bracket 130 attached at a foot 132 of the bed frame 112 in the foot section 118 to prevent a mattress (not shown) that may be placed on the bed frame 112 from falling off of the bed frame 112. The multi-function device 10 is shown installed on the side 128 of the head section 114.

As can be appreciated, the adjustable bed system 100 may include other features or components such as, by way of example only, a lumbar support device, a massage device for vibrating a mattress, and one or more lights for illuminating various areas of the adjustable bed system 100. The adjustable bed system 100 allows for the adjustable bed frame 112 and in turn a mattress to be put into different positions. For example, the adjustable bed system 100 may be adjusted to prop up a head of an individual to view television or to read a book, or elevate legs of the individual for comfort, or sleep in a zero gravity position for further comfort. The adjustable bed system 100 may have other features and components such as a wired handheld control, a wireless remote control, reading or night lights, a wave function device, a timer device, various movable and stationary frame members, solenoids, and linkages to connect the motors 120 and 124 to various other movable frame members. The adjustable bed system 100 may be any size and shape so as to contain or support conventionally available mattresses such as a full, queen, California king, or king sized mattress.

Figure 5:
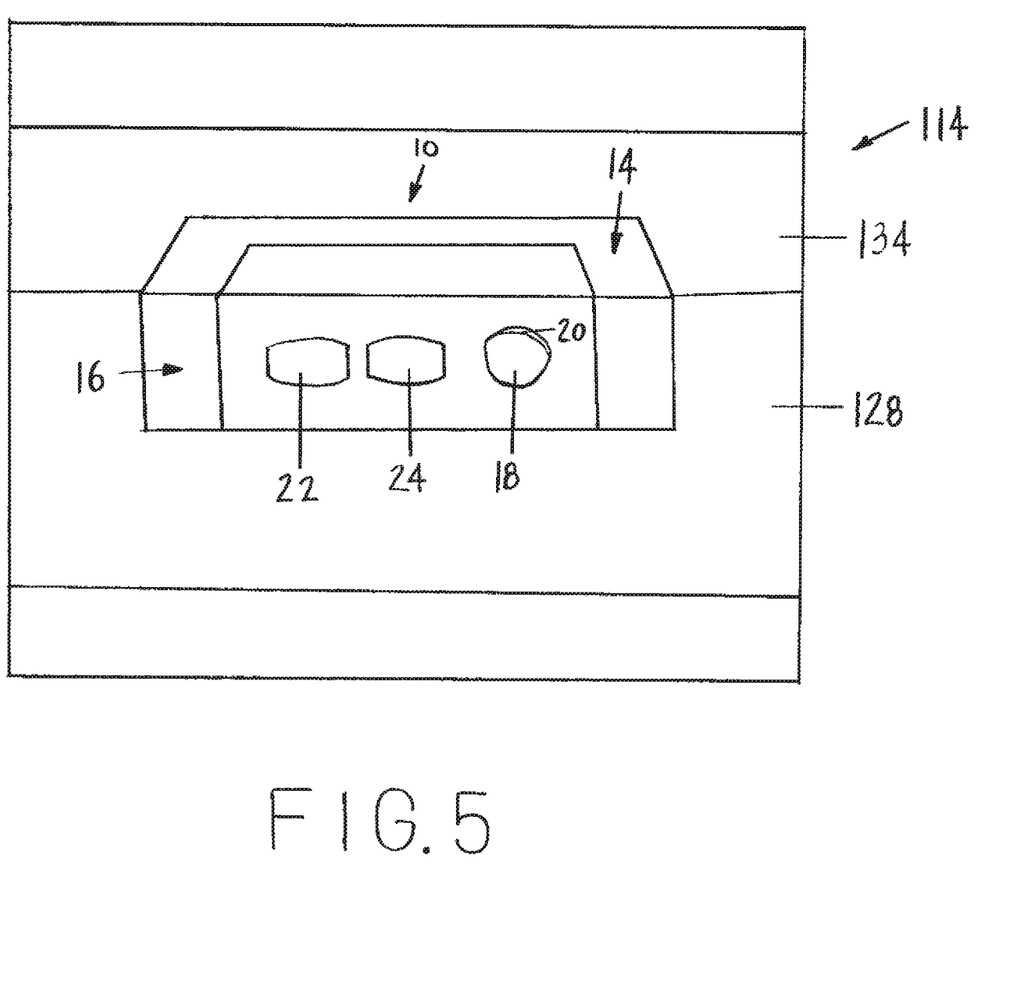
FIG. 5 is an enlarged perspective view of the multi-function device for an adjustable bed system installed in the adjustable bed system.

Referring now to FIG. 5, an enlarged view of the multi-function device 10 being inserted into the side 128 of the head portion 114 of the bed frame 112 is shown. The multi-function control device 10 has the button 18 surrounded by the light 20 and the USB ports 22 and 24. The device housing 12 has the side portion 16 fitted into the side 128 and the upper portion 14 is fitted into a top surface 134 of the head portion 114 of the bed frame 112. The device 10 is flush with the side 128 and the top surface 134 to be easily accessible by an individual using the device 10. Also, the ports 22 and 24 are readily accessible so that a device, such as a smart phone, may be plugged into the ports 22 and 24.

Figure 6:
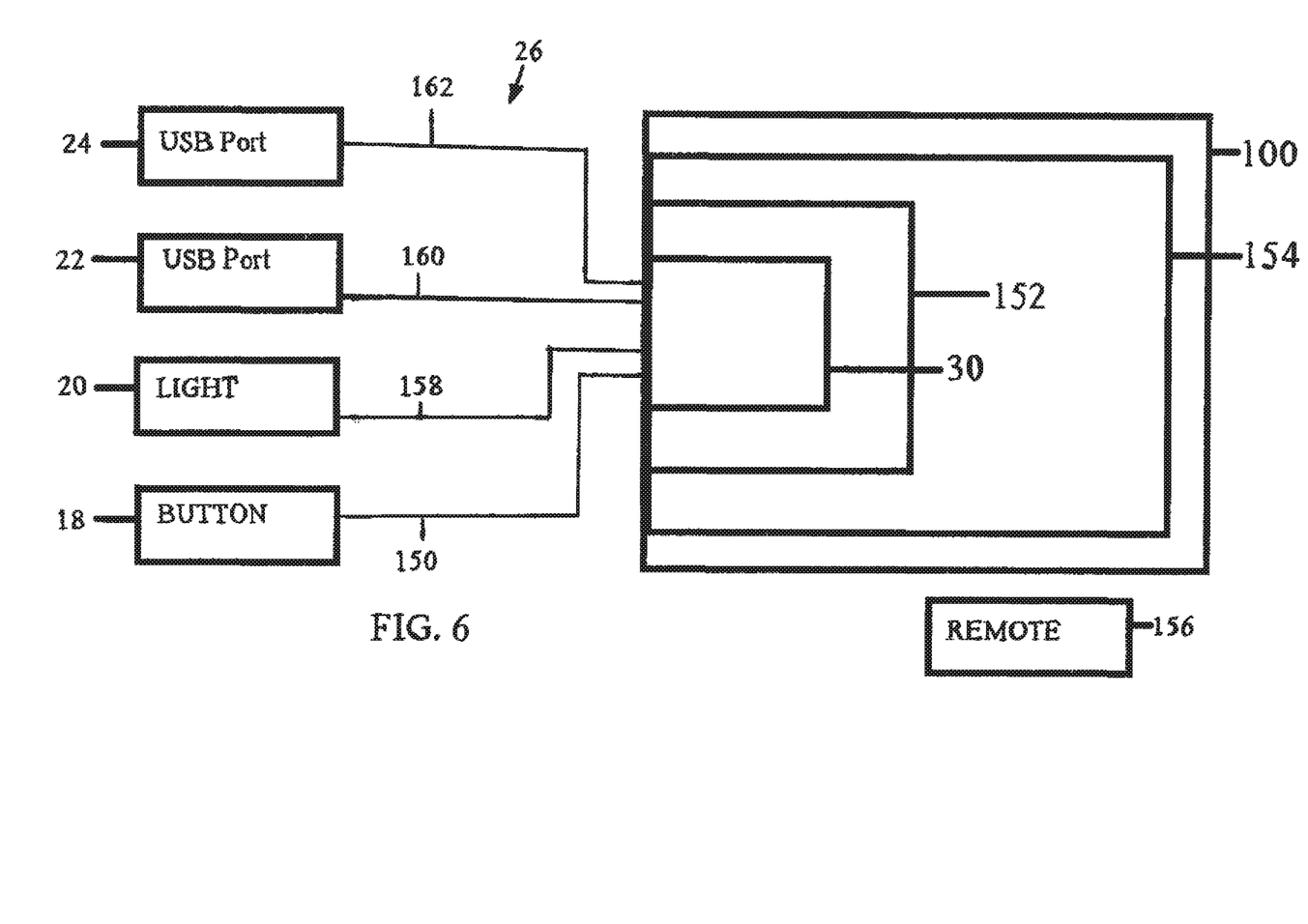
FIG. 6 is a schematic block diagram of the multi-function device for an adjustable bed system constructed according to the present disclosure.

FIG. 6 illustrates a schematic block diagram of the multi-function device 10 and the adjustable bed system 100. The device 10 has the button 18 connected through the cord 26 to the connector 30 via a wire 150. Once the button 18 is pressed a signal will be sent over the wire 150 to the connector 30. The connector 30 is inserted into a connector 152 of a control box 154 of the adjustable bed system 100. The control box 154 is used to control various functions of the adjustable bed system 100. The adjustable bed system 100 may also have a remote control 156. The light 20 is also connected to the connector 30 by a wire 158. The first USB port 22 is connected to the connector 30 by a wire 160. Also, the second USB port 24 is connected through the cord 26 to the connector 30 by a wire 162. As can be appreciated, all of the wires 150, 158, 160, and 162 are within the cord 26. Although single wires 150, 158, 160, and 162 are shown for purposes of clarity, it should be understand that multiple wires may be used to connect the various components of the device 10 to the adjustable bed system 100.

The multi-function device 10 operates in the following manner. When the button 18 is pressed and held for five seconds, the adjustable bed system 100 will allow the remote 156 to be synced to the control box 154. This is known as remote pairing mode. The remote 156 may control various functions of the adjustable bed system 100. By way of example, the remote 156 may have buttons in which the head section 114 may be adjusted up or down or the foot section 118 may be adjusted up or down. When the button 18 is pressed once movement of the adjustable bed system 100 will be halted. In essence, by pressing the button 18 once the multi-function device 10 incorporates an emergency stop function to stop operation of the adjustable bed system 100. In the event that a user needs to stop operation of the adjustable bed system 100 and the remote 156 is not available then the user only needs to press the button 18 once to stop operation of the adjustable bed system 100. Also, when the button 18 is pressed four times the adjustable bed system 100 will enter into an access point mode of operation. This allows the control box 154 of the adjustable bed system 100 to be seen by other wireless devices (not shown). For example, the adjustable bed system 100 may be connected by a WiFi (wireless fidelity) connection to another device such as an Amazon Echo device, an Amazon Echo Dot device, a Google Home device, or an Apple HomePod. By pressing the button 18 four times, the various other devices can be programmed to interface with the adjustable bed system 100. The device 10 allows easy and quick access to the control box 154 of the adjustable bed system 100. The light 20 provides visual feedback that the adjustable bed system 100 has entered into the various modes of operation. In particular, when the button 18 has been pressed four times to place the system 100 into the access point mode, the light 20 will blink until pairing is successful. Once pairing has been successful the light 20 will be extinguished or turned off. Also, when the button 18 has been held for five seconds placing the system 100 into remote pairing mode, the light 20 will blink until remote pairing has been successful. Again, once remote pairing has been successfully completed the light 20 will be turned off. Further, any device that may be connected into the USB ports 22 and 24 may be connected so that the device may be charged by the adjustable bed system 100. When the button 18 is pressed and held for fifteen seconds this puts the control box 154 into a mode of operation in which a standard remote control may be synced to the control box 154.

From all that has been said, it will be clear that there has thus been shown and described herein a multi-function device for an adjustable bed system which fulfills the various advantages sought therefore. It will become apparent to those skilled in the art, however, that many changes, modifications, variations, and other uses and applications of the subject multi-function device for an adjustable bed system are possible and contemplated. All changes, modifications, variations, and other uses and applications which do not depart from the spirit and scope of the disclosure are deemed to be covered by the disclosure, which is limited only by the claims which follow.

What is claimed is:

1. A multi-function device for an adjustable bed system comprising:
   an adjustable bed system having an adjustable bed frame having an adjustable head section having a side and a top surface, a mid section, a foot section, a control box, and a remote capable of being synced to the control box;
   a housing installed into the side and the top surface of the adjustable head section, the housing having an upper portion and a side portion, the side portion having a button having a light, and a port, operation of the button once for sending a first signal to the control box for stopping operation of the adjustable bed system, operation of the button for a period of time for sending a second signal to the control box for syncing the remote to the control box, operation of the button for a number of times for sending a third signal to the control box for connecting the control box to another wireless device, the button and the port being accessible to an individual using the multi-function device,
   a cord connected to the housing, the cord having a wire connected to the button; and
   a connector connected to the wire and the connector connected to the control box.

2. The multi-function device for an adjustable bed system of claim 1 wherein the port comprises an USB port.

3. The multi-function device for an adjustable bed system of claim 1 wherein the port comprises a Mini-USB port.

4. The multi-function device for an adjustable bed system of claim 1 further comprising a second port in the side section.

5. The multi-function device for an adjustable bed system of claim 1 wherein the device housing further comprises a first clip and a second clip.

6. The multi-function device for an adjustable bed system of claim 1 wherein the port comprises a Micro-USB port.

7. The multi-function device for an adjustable bed system of claim 1 wherein operation of the button initiates illumination of the light.

8. The multi-function device for an adjustable bed system of claim 1 wherein the port comprises an USB-B port.

9. A multi-function device for an adjustable bed system comprising:
   an adjustable bed system having an adjustable bed frame having an adjustable head section having a side and a top surface, a mid section, a foot section, a control box, and a remote capable of being synced to the control box;
   a housing installed into the side and the top section of the adjustable head section, the housing having an upper portion and a side portion, the side portion having a button having a light, and a port, operation of the button once for sending a first signal to the control box for stopping operation of the adjustable bed system, operation of the button for a period of time for sending a second signal to the control box for syncing the remote to the control box, operation of the button for a number of times for sending a third signal to the control box for connecting the control box to another wireless device, a central body housing positioned on an underside of the upper portion and an underside of the side portion, the central body housing having a first side, a back side, an extension portion along the back side, a second side, and a lid to cover the central body housing, the upper portion being flush with the top surface of the adjustable head section and the side portion being flush with the side of the adjustable head section, the button and the port being accessible to an individual using the multi-function device;
   a cord connected to the housing, the cord having a wire connected to the button; and
   a connector connected to the wire, and the connector connected to the control box.

10. The multi-function device for an adjustable bed system of claim 9 wherein the lid further comprises a screw hole for receiving a screw to secure the lid to the central body housing.

11. The multi-function device for an adjustable bed system of claim 9 wherein the extension portion comprises a first side, a back side, and a second side.

12. The multi-function device for an adjustable bed system of claim 11 wherein the back side of the extension portion has an opening in which a strain relief connector may be inserted to secure the cord in place.

13. The multi-function device for an adjustable bed system of claim 9 wherein the device housing further comprises a first clip and a second clip.

14. The multi-function device for an adjustable bed system of claim 13 wherein the clips secure the device housing into the side of the head section of the adjustable bed frame.

15. The multi-function device for an adjustable bed system of claim 9 wherein the port comprises an USB port.

16. A multi-function device for an adjustable bed system comprising:
   an adjustable bed system having an adjustable bed frame having an adjustable head section having a side and a top surface, a mid section, a foot section, a control box, and a remote capable of being synced to the control box;
   a housing installed into the side of the adjustable head section, the housing having an upper portion and a side portion, the side portion having a button having a light, and a port, operation of the button once for sending a first signal to the control box for placing the control box into a first mode of operation for stopping operation of the adjustable bed system, operation of the button for a period of time for sending a second signal to the control box for placing the control box into a second mode of operation for syncing the remote to the control box, operation of the button for a number of times for sending a third signal to the control box for placing the control box into a third mode of operation for connecting the control box to another wireless device, a cord connected to the housing, the cord having a wire connected to the button, and a connector connected to the wire, the upper portion being flush with the top surface of the adjustable head section for identifying the position of the housing along the head section and the side portion being flush with the side of the adjustable head section, the button and the port of the housing being accessible to an individual using the multi-function device; and
   the control box having a connector, the connector of the housing for insertion into the connector of the control box, the signals for placing the control box into the modes of operation.

17. The multi-function device for an adjustable bed system of claim 16 wherein the adjustable bed system further comprises a motor for adjusting a portion of the adjustable bed system and the button is pressed for halting operation of the motor in the first mode of operation.

18. The multi-function device for an adjustable bed system of claim 16 wherein the port comprises a Mini-USB port.

19. The multi-function device for an adjustable bed system of claim 16 wherein the port comprises an USB port.

20. The multi-function device for an adjustable bed system of claim 16 wherein the light is illuminated when the control box is placed into the second mode of operation to indicate that the second mode of operation has begun and the light is turned off to indicate that the second mode of operation has been successfully completed.

* * * * *